(No Model.)

P. TOWEY.
VALVE.

No. 551,341. Patented Dec. 10, 1895.

WITNESSES
M. B. Fowler
J. Edw. Fowler

INVENTOR
Patrick Towey
by T. Walter Fowler
his Attorney

United States Patent Office.

PATRICK TOWEY, OF SILVER BROOK, PENNSYLVANIA, ASSIGNOR TO HUGH SHAFFER, OF SAME PLACE.

VALVE.

SPECIFICATION forming part of Letters Patent No. 551,341, dated December 10, 1895.

Application filed March 8, 1895. Serial No. 540,990. (No model.)

*To all whom it may concern:*

Be it known that I, PATRICK TOWEY, a citizen of the United States, residing at Silver Brook, in the county of Schuylkill and State of Pennsylvania, have invented certain new and useful Improvements in Valves; and I do hereby declare the following to be a full, clear, and exact description of the invention, such as will enable others skilled in the art to which it appertains to make and use the same.

My invention relates to that class of valves known as "reciprocating" valves, in which the valve is moved toward and from its seat by the rotary movement of its hind wheel, or a lever if the same is used, and without imparting its rectilinear movement to the wheel, or the nut or sleeve which connects it with the stem of the valve; and my invention consists of the constructions and combinations of devices which I shall hereinafter fully describe and claim.

Figure 1:
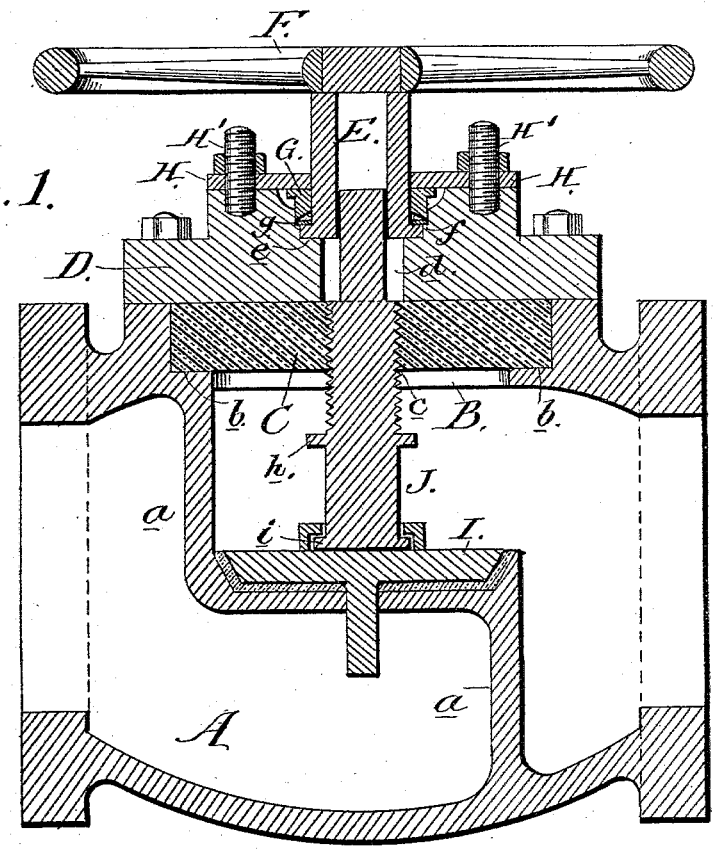
Figure 2:
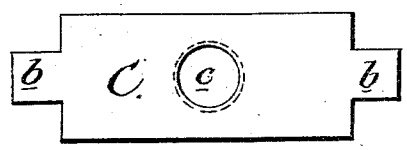

Figure 1 represents a vertical sectional view of a valve and casing embodying my invention. Fig. 2 is a detail of the removable cross-bar in which the threaded portion of the stem of the valve is mounted.

In said drawings A represents a valve-casing of the usual form having a diaphragm or partition $a$ provided with a valve-seat. The upper side of the casing is formed with an opening B, and in this open end is mounted a cross-bar C composed, preferably, of brass, having lugs or flanges $b$ at its ends adapted to engage corresponding sockets in the body of the casing whereby the cross-bar is removably secured, the said cross-bar having at its center a threaded opening $c$ in which a threaded portion of the valve-stem works, as I shall hereinafter disclose.

Securely bolted to the upper side of the casing A and bearing upon the top surface of the cross-bar to confine said bar in place, is the usual bonnet D, having at its center, in the lower portion of the bonnet, an opening $d$ which is of sufficient diameter to receive the threaded portion of the valve-stem when the valve is open as I will presently disclose.

At the upper end of the opening $d$ a shoulder is formed by increasing the diameter of the central opening, as shown at $e$, and serves as a seat for the flanged lower end of the hollow nut E, whose upper end is provided with a hand-wheel F, although a lever may be substituted for the hand-wheel if desired. In order that the hollow nut E may be held against longitudinal movement, I again slightly increase the diameter of the central opening above the shoulder $e$ so that a second shoulder $f$ is formed which is about flush with the top of the flange at the base of the hollow nut; and upon this second shoulder and the top of the said flange is seated a packing-ring $g$ of brass. On top of this is placed packing of any well-known description, and which is secured in place by a gland G, as shown. Above the gland and securely bolted to the bonnet, is a plate H, which holds the gland in place, and by which the gland can be regulated by loosening or tightening the nuts on the two stud-bolts shown at H'.

The valve I is of any usual form and is adapted to snugly fit its seat. Its stem J has an annular flange or collar $i$ at its lower end which is fitted to the valve so that the stem may be turned without imparting its axial movement to the valve. Above this lower end the valve-stem is formed with a second annular collar or flange $h$, and from this point to a point about on a level with the plane of the top of the cross-bar the stem is threaded and is designed to engage the threaded opening of the cross-bar. From the upper end of this threaded portion the stem is reduced and is preferably square or of rectangular form; and after passing through the opening $d$ in the center of the bonnet is designed to enter and be engaged by the correspondingly-shaped socket of the hollow nut, whereby as the nut is turned the valve-stem is likewise turned and at the same time moved longitudinally. From this description it will be seen that upon turning the hand-wheel the hollow nut is made to revolve, but cannot move longitudinally. The axial movement of the nut being transmitted to the stem of the valve, the latter is simultaneously moved in the direction of its length by reason of the engagement of the threaded portion with the threaded cross-bar. This movement is also communicated to the valve to lift the same from its seat, and until the annular collar or flange $h$ comes into engagement with and presses against the bottom of the cross-bar, and makes the stem steam-tight at this point, and while the valve is full open, it being understood that the meeting faces of the cross-bar and the collar are accurately turned for this purpose. A reverse operation of the hand-wheel will lower the valve and securely seat the same.

There is no packing around the stem of my valve. The hollow nut alone is packed. Therefore my valve is less hard on its packing, as the rotary motion of the nut will not wear the packing near as much as when the valve-stem itself is packed, for a valve-stem of this description moves up and down or reciprocates. The thread of my valve-stem is thoroughly protected from dirt. This is not generally so in this form of valve, as in many instances the stem works in a thread formed in the bonnet, and the whole bonnet must be thrown away when the thread becomes worn. In my case this is not so, as my valve-stem works in a thread cut in a cross-bar which is removably seated, whereby when the thread becomes worn, which will not likely occur, owing to the manner of seating it, the bar may be removed and replaced by another at a small expense.

My valve is compact; the valve-stem is short and the hollow nut is in the center line of the stem.

My valve can be packed with the valve open or closed. It requires less packing than many others, and contains less metal and fewer parts; and my improvements are applicable to all forms and sizes of valves operating on the principle described. The thread in the cross-bar through which the stem works, is also so situated that it engages a thread on the valve-stem located about midway between the hand-wheel, or lever, and valve I, whereby by placing the bearing at this point there is less wear and strain on the threads.

Having thus described my invention, what I claim as new, and desire to secure by Letters Patent, is—

1. In a valve, the combination, of a casing open at its top and provided with sockets, a removable cross bar in said open top having lugs to fit said sockets, and having a central threaded opening, a valve, a valve stem threaded at its center with a collar or flange at the base of the threaded portion adapted to bear against the lower face of the cross bar, when the valve is open, to form a tight joint around the stem, a bonnet having a central opening for the stem, and a shoulder near its center, a hollow nut receiving and guiding the upper end of the stem, and having a flange at its base seated upon said shoulder, a packing for the flange and means for holding it and the nut in place.

2. In a valve, the combination, of a casing, a valve, a valve stem threaded at its central portion only, a removable cross bar in which the threaded portion of the stem works, a bonnet for confining the cross bar in place, having a central opening to receive the stem, a shoulder or flange formed by enlarging said opening and a second shoulder above the first named one, a hollow nut having a flange at its base adapted to rest upon the first named shoulder with its upper surface about flush with the second shoulder, a packing lying upon the flange and said second shoulder, a gland surrounding the nut and confining the packing in place, means for securing the gland and means for rotating the nut.

In testimony whereof I affix my signature in presence of two witnesses.

PATRICK TOWEY.

Witnesses:
RHONE TRESCOTT,
HENRY ZEIGLER.